June 23, 1931.   J. MOREAU   1,811,588
OIL LOSS PREVENTING DEVICE
Filed March 19, 1929   2 Sheets-Sheet 2
FIG.2
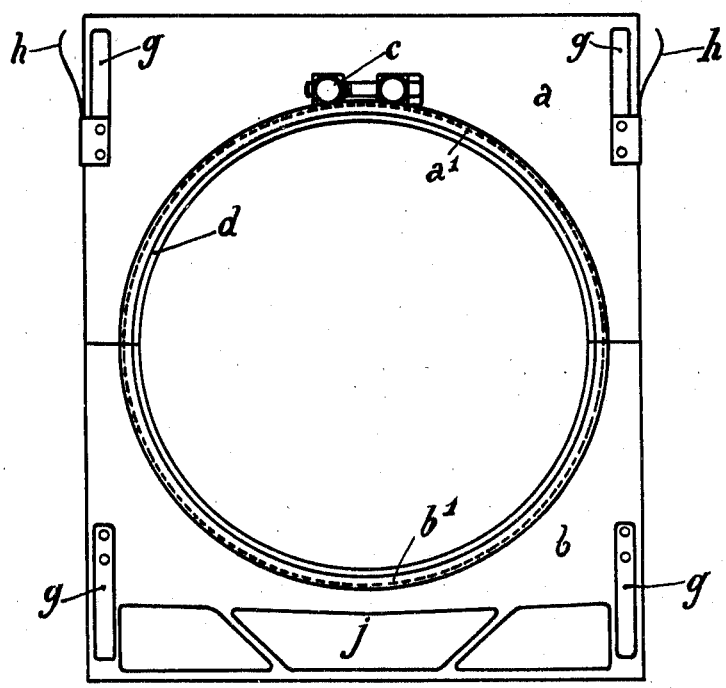
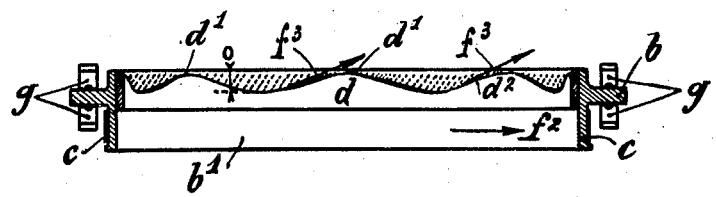
FIG.3

Patented June 23, 1931

1,811,588

UNITED STATES PATENT OFFICE

JULES MOREAU, OF LA GARENNE-COLOMBES, FRANCE

OIL LOSS PREVENTING DEVICE

Application filed March 19, 1929, Serial No. 348,319, and in France April 7, 1928.

The present invention has for an object a closing device for vehicle journals as well as those of freight cars and all other analogous rolling stock, destined to prevent any oil losses from the journal box and shaft bearings which are given a movement of rotation in both directions.

The invention will be more readily understood by those skilled in the art in the following description when taken in connection with the accompanying drawings forming part of this specification and in which—

Fig. 2 is a front view thereof; and

Fig. 3 is a sectional view in plan of the lower part of my device.

Figure 1:
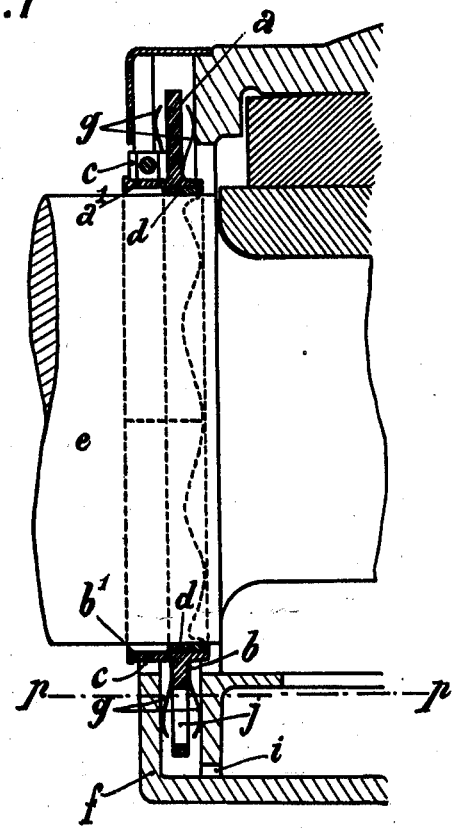
Fig. 1 is a fragmentary longitudinal section of my device attached to a journal box.

Referring to the drawings more in detail, my device is composed of two plates $a$ and $b$ of light metal, such as aluminium, for example, or other metal which has been made light by suitable means, or of any suitable material having the proper resistance, such as wood for example. Said plates are provided with two semi-cylindrical flanges $a^1$ $b^1$ respectively, connected together by a collar or band of steel $c$ which rigidly unite them with each other. In the bore thus formed is secured by means of screws, rivets, glue or any other suitable means, a band $d$ of leather or other analogous material, which surrounds the axle $e$ and is adjusted thereon with light friction.

This arrangement of the closing device in two parts connected together to form a single piece, allows very easy disassembling and mounting and prevents the disadvantages of closing devices of two independent parts, generally employed which are inefficient since an appreciable loss of oil takes place through the necessary play which must exist at their junction point, even if this joining is produced by interfitting the members in question.

Said closing device lodged in the member $f$ of the journal box provided for that purpose is adapted to occupy normal position therein by means of a series of springs $g$, of suitable tension, and sufficiently flexible to enable the closing device to retain, without effort, its perpendicular position with respect to the shaft, whatever may be the longiudinal displacement or transverse displacement of the journal box with respect to the shaft.

On the vertical sides of the closing device are placed two springs $h$ (Fig. 2) which normally retain said device for compensating for all tendency of the device to be carried around by the rotation of the shaft and prevent its gaining the upper angles thereof.

The band $d$ placed between the metallic body of the closure and the shaft, represents the efficient part of the device, by its composition and by its form assures with minimum friction and wear, its contact with the shaft. Said band $d$, shown in Fig. 3, is cut along a sinuous line containing notched out portions as shown, the apices of which may be either a rounded or acute angle as shown at $d^1$.

On the other hand, contrary to current practice, the recess of the part $b$ of the closing device is in communication with the journal box $f$, forming a reservoir for oil, whose level is for example at $p$—$p$ (Fig. 1), through the medium of a hole $i$. Said recess can thus receive the oil retained by the closing device which has run out on the surface thereof, without the level of oil in the said recess rising, as would happen if the hole $i$ did not exist, in such a way that the oil does not tend to escape to the outside. The part $b$ submerged in the oil presents a suitable perforation $j$, which prevents all projection of oil to the interior during displacement of the closing device, notwithstanding the presence of the oil level in the said recess.

The efficiency of my device will be fully appreciated when considering the operation thereof which is as follows:

By rotation of the shaft in one direction or the other and from its longitudinal displacement or transverse displacement with respect to the box, the apices of the friction band $d$ will retain the particles of oil which tend to be diverted toward the exterior. If, due to longitudinal displacement of the axle, the particle of oil arrives in the space included between two apices adjacent to each other, as shown by the dotted line sectioning in Fig. 3, it will come into contact with one of the sides of the angle, which by its oblique position, sends back the said drop toward the apex, that is toward the interior of the box. According to the direction of rotation of the axle, one or the other of the sides of the angle come into play.

Referring to Fig. 3, it will be noticed, that if the axle turns in the direction of the arrow $f^2$, for example, it will be one of the sides $d^2$ which comes into play, the drop rising along the side $d^2$ in the direction of the arrow $f^2$.

In order that no drop of oil leave the space above referred to (cross-hatched triangles) it suffices to give the triangles an altitude greater than the maximum displacement of the axle in the longitudinal direction, and thus all the particles of oil will be pushed back toward the interior and irrespective of the direction of rotation of the axle.

While I have described what I deem to be the preferred form of my device, I do not wish to be limited thereto as there might be many changes made in the construction, form and arrangement of parts to suit the device for various types of bearings and journal boxes, without departing from the spirit of my invention as comprehended within the scope of the appended claims.

Having described my invention what I claim as new and desire to secure by Letters Patent is:

1. A device for preventing waste of lubricant in journal boxes and bearings of rotatable shafts comprising a plate, a tube rigid with said plate, a band of supple material disposed on the interior of said tube adapted to surround the shaft and a plurality of sinuous projections formed on said band for projecting the particles of lubricant which come in contact therewith toward the interior.

2. A device for preventing waste of lubricant in journal boxes and bearings of rotatable shafts comprising a tube, a plate carried by said tube, a band of supple material disposed on the interior of said tube adapted to surround the shaft, curved leaf springs carried by the edge of said plate adapted to prevent the tendency of said plate to rotate with said shaft, and a plurality of sinuous projections formed on said band for projecting the particles of lubricant which come in contact therewith toward the interior.

3. An oil guard for journal boxes and bearings of rotatable shafts comprising a band of supple material adapted to be applied around the shaft and provided with sinuous projections for projecting the particles of lubricant which come in contact therewith toward the interior.

In testimony whereof I have signed this specification.

JULES MOREAU.